US012759122B2

(12) United States Patent
Kuo

(10) Patent No.: US 12,759,122 B2
(45) Date of Patent: Oct. 13, 2026

(54) TORQUE STRUCTURE

(71) Applicant: Wen-Chin Kuo, Taichung City (TW)

(72) Inventor: Wen-Chin Kuo, Taichung City (TW)

( * ) Notice: Subject to any disclaimer, the term of this patent is extended or adjusted under 35 U.S.C. 154(b) by 286 days.

(21) Appl. No.: 18/763,413

(22) Filed: Jul. 3, 2024

(65) Prior Publication Data

US 2026/0008162 A1 Jan. 8, 2026

(51) Int. Cl.
*B25B 23/142* (2006.01)
*B25B 23/14* (2006.01)
*B25B 21/00* (2006.01)

(52) U.S. Cl.
CPC ........ *B25B 23/1427* (2013.01); *B25B 23/141* (2013.01); *B25B 21/00* (2013.01); *B25B 23/14* (2013.01)

(58) Field of Classification Search
CPC ... B25B 23/1427; B25B 23/141; B25B 23/14; B25B 21/00
See application file for complete search history.

(56) References Cited

U.S. PATENT DOCUMENTS

| | | | | |
|---|---|---|---|---|
| 9,056,391 | B1 * | 6/2015 | Wu | B25B 23/141 |
| 11,203,101 | B1 * | 12/2021 | Chan | B25B 13/463 |
| 11,298,808 | B1 | 4/2022 | Kuo | |
| 2020/0406435 | A1 * | 12/2020 | Kuo | B25B 13/463 |
| 2021/0402576 | A1 * | 12/2021 | Wu | B25B 23/141 |

* cited by examiner

*Primary Examiner* — Mahdi H Nejad
(74) *Attorney, Agent, or Firm* — LANWAY IPR SERVICES; Chun-Ming Shih

(57) ABSTRACT

A torque wrench includes a first body, a second body, a locking unit, an adjusting unit, a third body unit, a fourth body unit, and a fitting member. The first body is provided with a first receiving chamber. The second body is pivotally connected with the first body. The adjusting unit includes an adjusting member provided with a spacer, a first mounting section, a second fitting portion, and a first inclined face. The fourth body unit includes a fourth body assembled with the first body and provided with a second mounting section mounted on the first mounting section. The second mounting section is loosely fitted on the first mounting section. The fitting member extends through the second mounting section and is screwed into the second fitting portion. The fitting member is provided with a second inclined face abutting the first inclined face.

11 Claims, 16 Drawing Sheets

C

TORQUE STRUCTURE

BACKGROUND OF THE INVENTION

Field of the Invention

The present invention relates to a hand tool and, more particularly, to a torque structure.

Description of the Related Art

A conventional torque structure was disclosed in the U.S. Pat. No. 11,298,808, and comprises a first body 10, a second body 20, a first elastic member 28, a first locking set 30, an adjusting set 40, an indication unit 50, a third body assembly 60, a second locking set 70, a third locking set 80, and a fourth body 90.

However, such a conventional torque wrench has the following disadvantage.

The second mounting portion 91 of the fourth body 90 is mounted on the first mounting portion 414 of the adjusting set 40 so that the first body 10 drives the fourth body 90 which drives the adjusting set 40 to adjust the length of the first elastic member 28 and to adjust the torque value. The second mounting portion 91 is loosely fitted on the first mounting portion 414 so that a gap is defined between the fourth body 90 and the adjusting member 41 of the adjusting set 40 due to a tolerance or allowance. If the tolerance is too large, a torque error is produced when the adjusting member 41 is driven to operate the first elastic member 28. If the gap between the fourth body 90 and the adjusting member 41 is made to the minimum value, the fourth body 90 cannot be mounted on the adjusting member 41 easily. Thus, the tolerance and the gap the second mounting portion 91 and the first mounting portion 414 cannot be coordinated or adjusted to the optimum degree.

BRIEF SUMMARY OF THE INVENTION

In accordance with the present invention, there is provided a torque wrench comprising a first body, a second body, a first fixing member, an elastic member, a push block, a locking unit, an adjusting unit, a third body unit, a control unit, a fourth body unit, and a fitting member. The first body is provided with a first receiving chamber. The second body is pivotally connected with the first body. The adjusting unit includes an adjusting member, a first seat, and a third fixing member. The adjusting member is provided with a spacer, a first screw portion, a third pivot portion, a first mounting section, a second fitting portion, multiple second slots, and a first inclined face. The fourth body unit includes a fourth body assembled with the first body and provided with a second mounting section mounted on the first mounting section. The second mounting section is loosely fitted on the first mounting section. The fitting member extends through the second mounting section and is screwed into the second fitting portion. The fitting member has an end provided with a second inclined face abutting the first inclined face.

According to the primary advantages of the present invention, when the fitting member extends through the second mounting section of the fourth body and is screwed into the second fitting portion of the adjusting member after the fourth body unit is assembled with the adjusting unit, the second inclined face of the fitting member presses the first inclined face, the second slots are slightly expanded outward by screwing of the fitting member, and the first mounting section presses the second mounting section, so that the second mounting section is closely fitted on the first mounting section. Thus, the fourth body unit is assembled with and disassembled from the adjusting unit easily and conveniently by operation of the fitting member.

According to another advantage of the present invention, the second mounting section is initially fitted on the first mounting section loosely. When the fitting member is screwed into the second fitting portion of the adjusting member, the second inclined face of the fitting member presses the first inclined face of the adjusting member, to expand the first mounting section slightly, and the first mounting section presses the second mounting section, so that the second mounting section is fitted on the first mounting section exactly, and the fourth body is closely fitted on the adjusting member. Thus, the fourth body unit is mounted on the adjusting unit closely without forming a gap therebetween.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
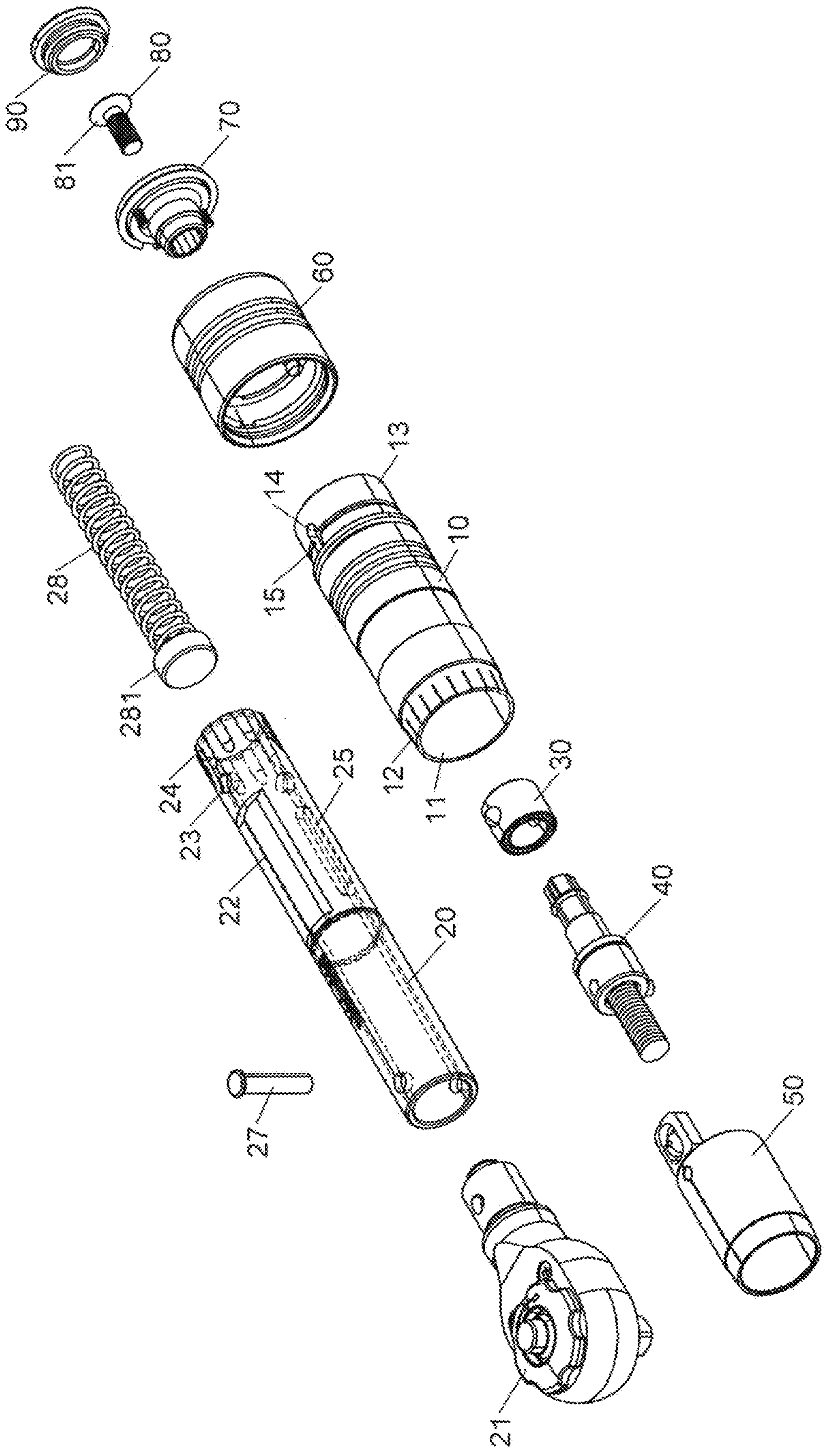
FIG. 1 is an exploded perspective view of a torque structure in accordance with the preferred embodiment of the present invention.
Figure 2:
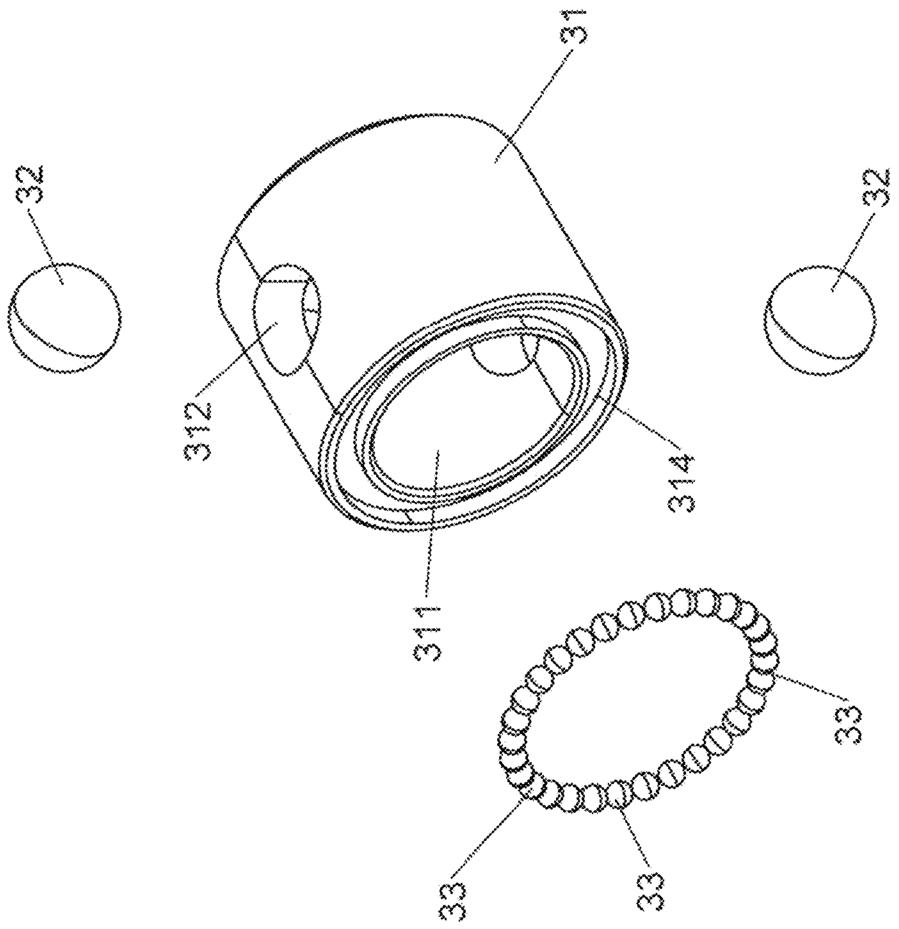
FIG. 2 is an exploded perspective view of a locking unit of the torque structure in accordance with the preferred embodiment of the present invention.
Figure 3:
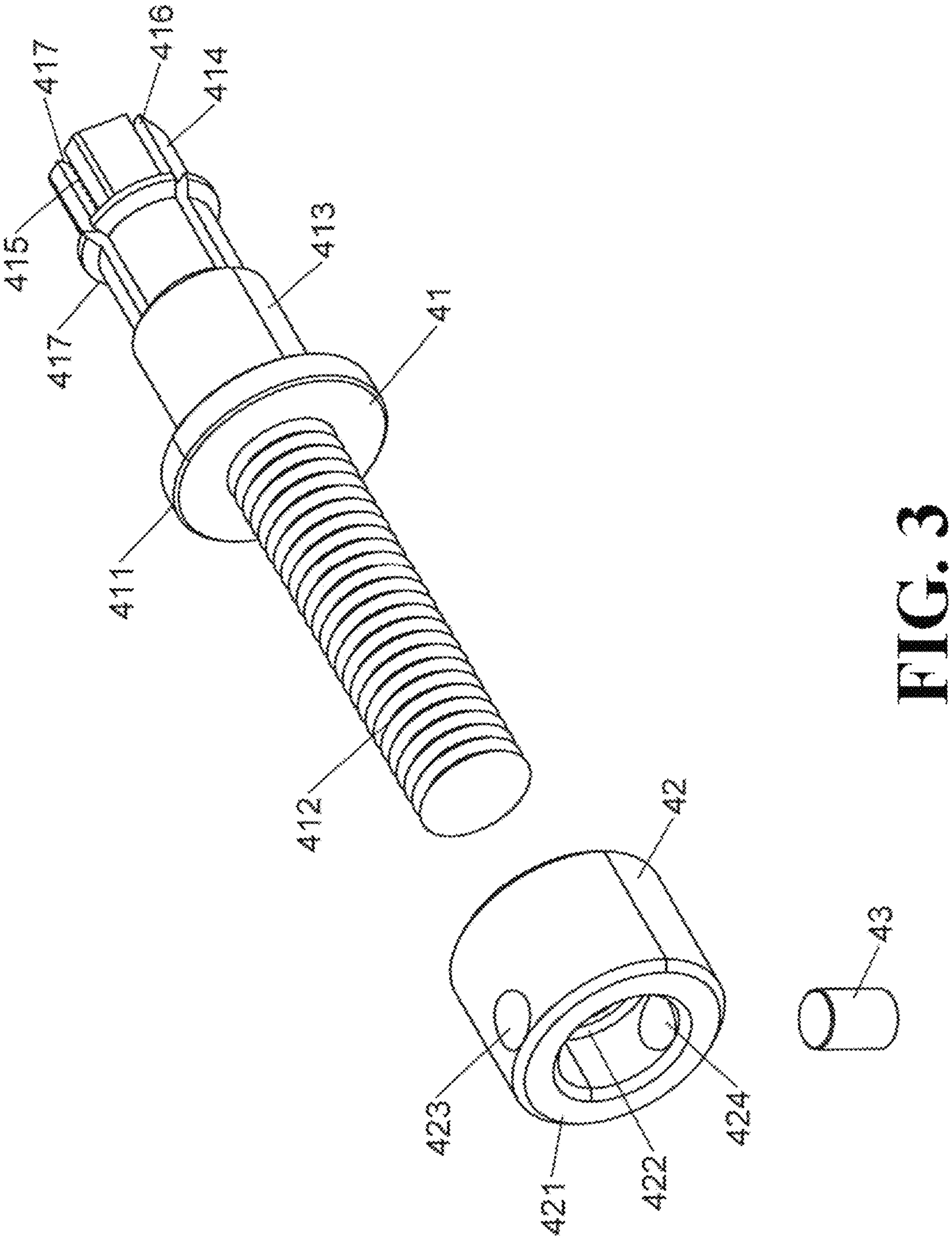
FIG. 3 is an exploded perspective view of an adjusting unit of the torque structure in accordance with the preferred embodiment of the present invention.
Figure 4:
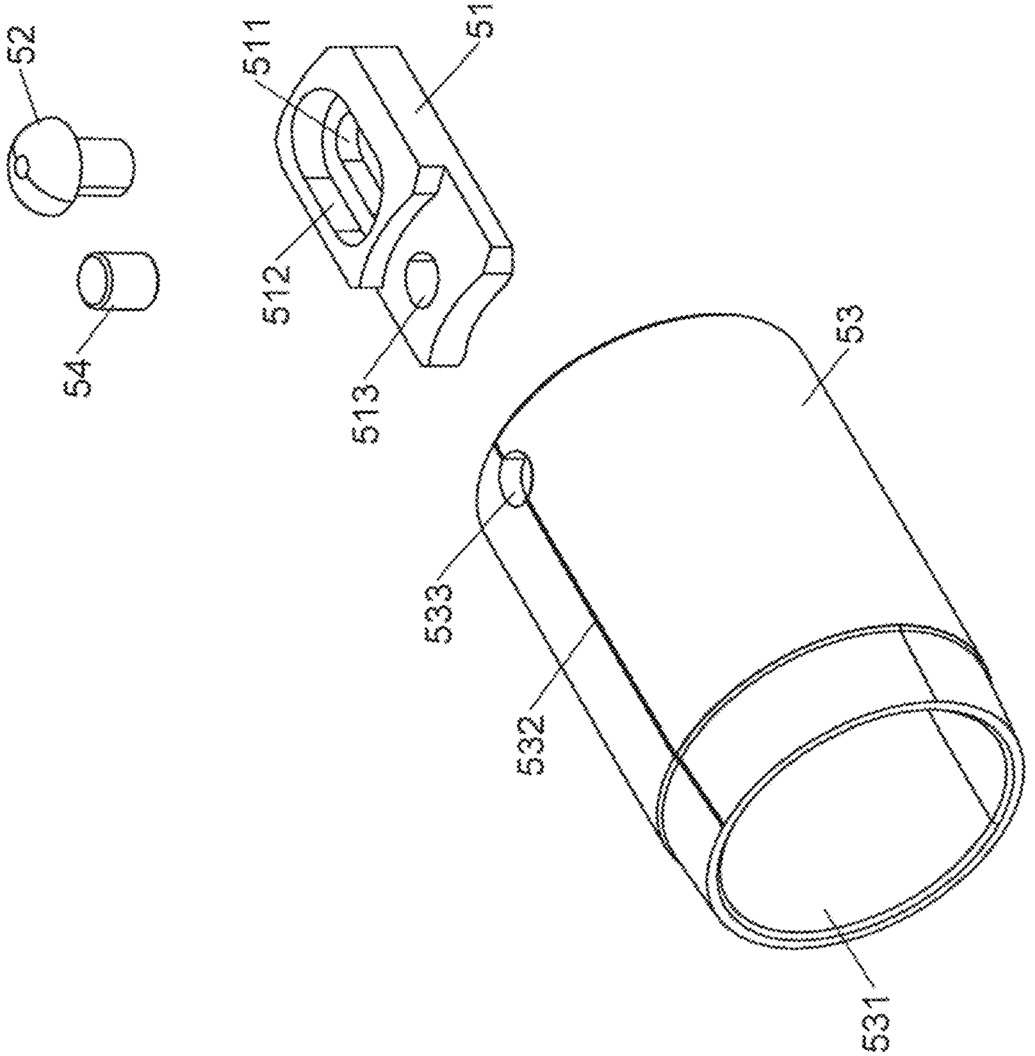
FIG. 4 is an exploded perspective view of a third body unit of the torque structure in accordance with the preferred embodiment of the present invention.
Figure 5:
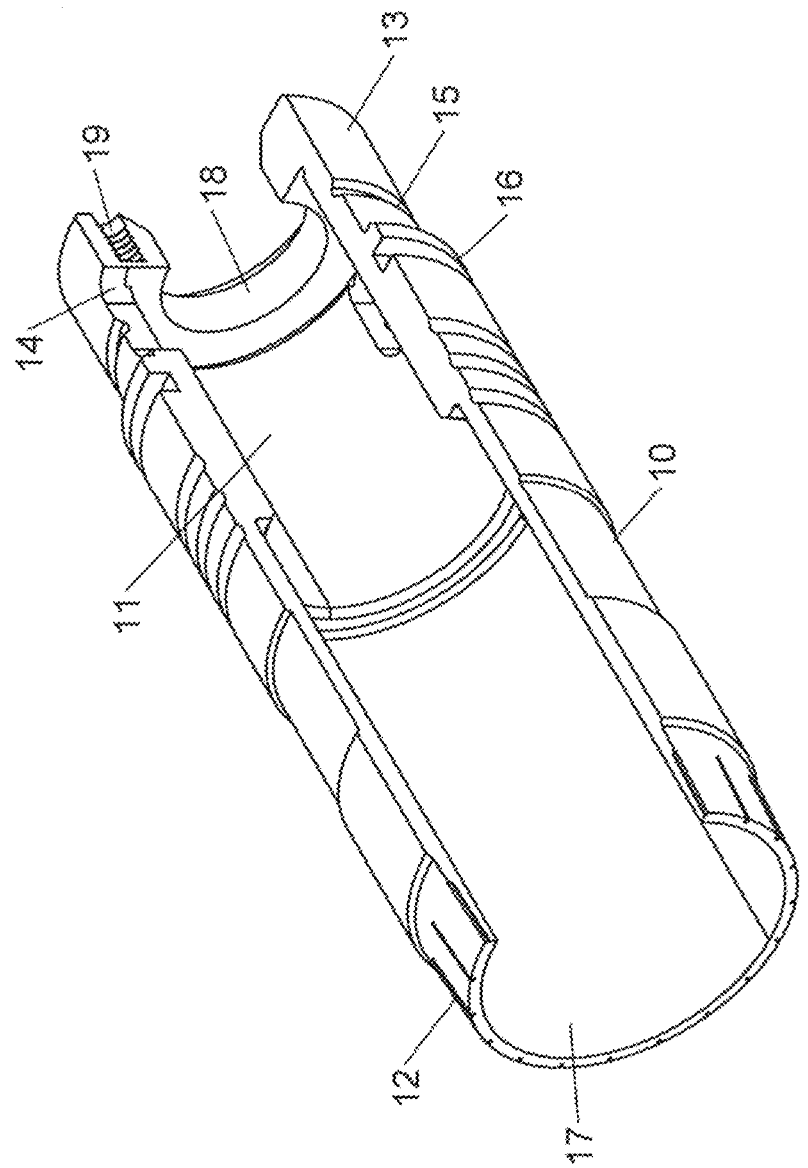
FIG. 5 is a perspective cross-sectional view of a first body of the torque structure in accordance with the preferred embodiment of the present invention.
Figure 6:
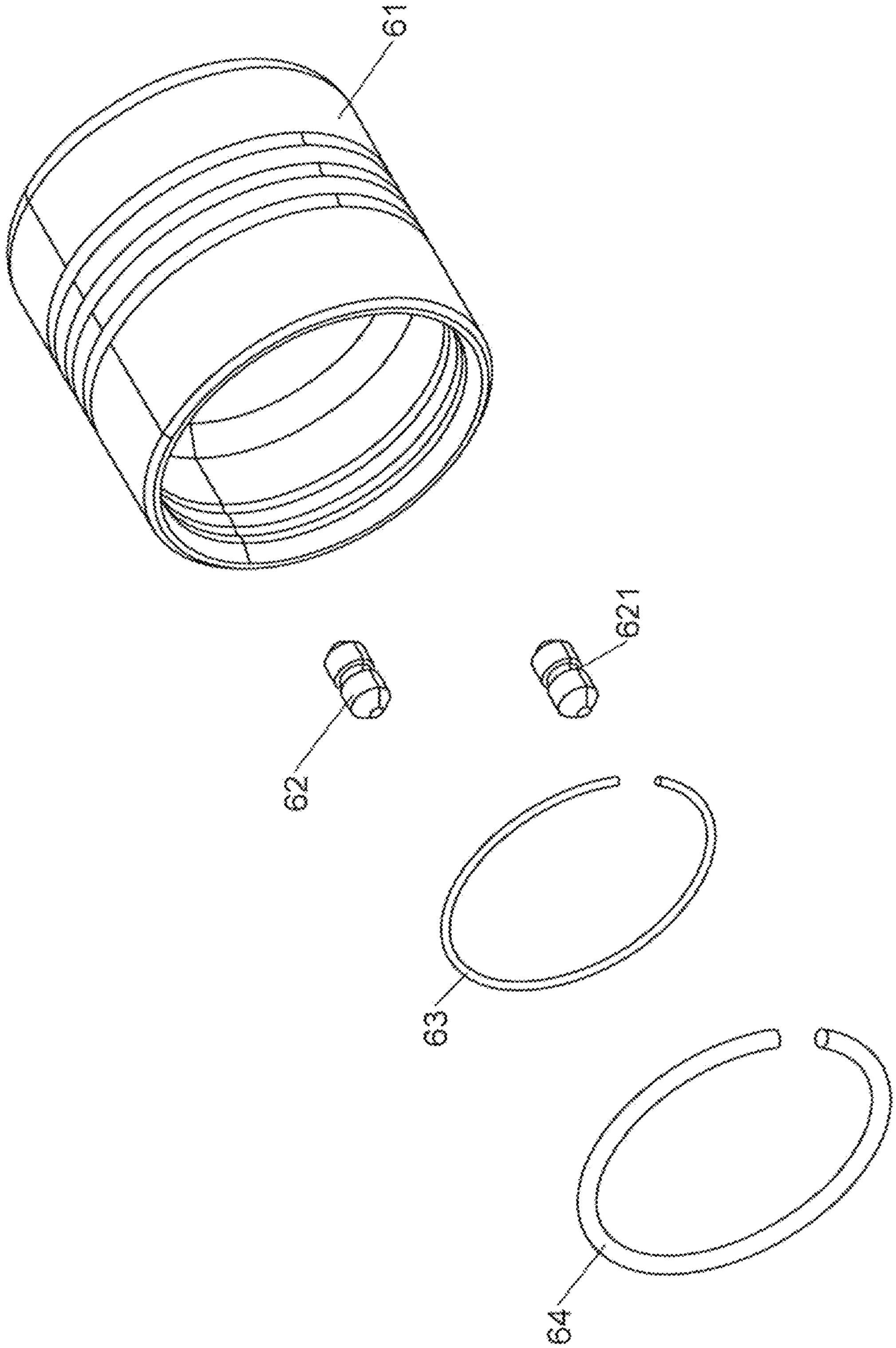
FIG. 6 is an exploded perspective view of a control unit of the torque structure in accordance with the preferred embodiment of the present invention.
Figure 8:
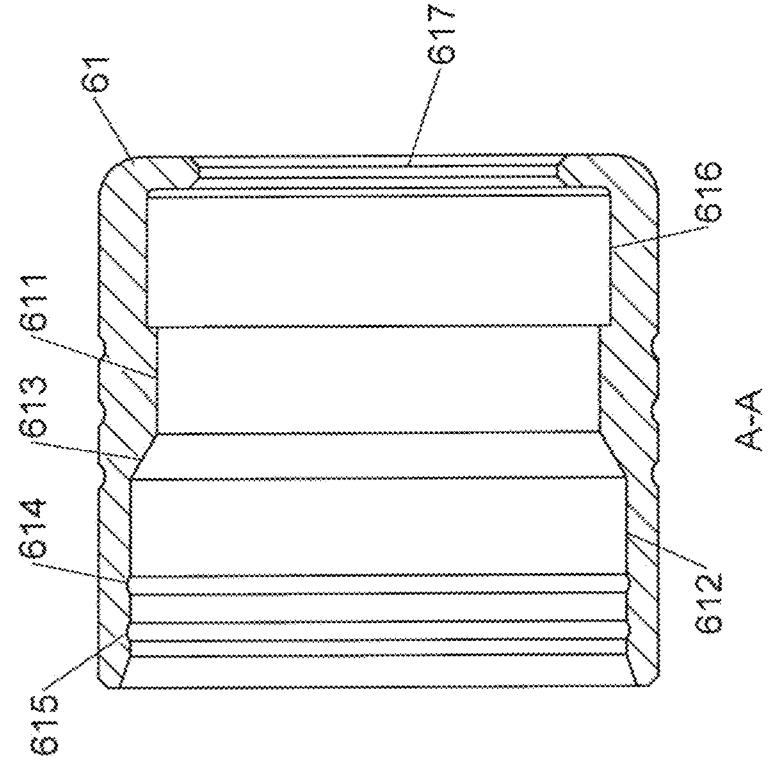
FIG. 8 is a cross-sectional view of the control collar of the torque structure taken along line A-A as shown in FIG. 7.
Figure 7:
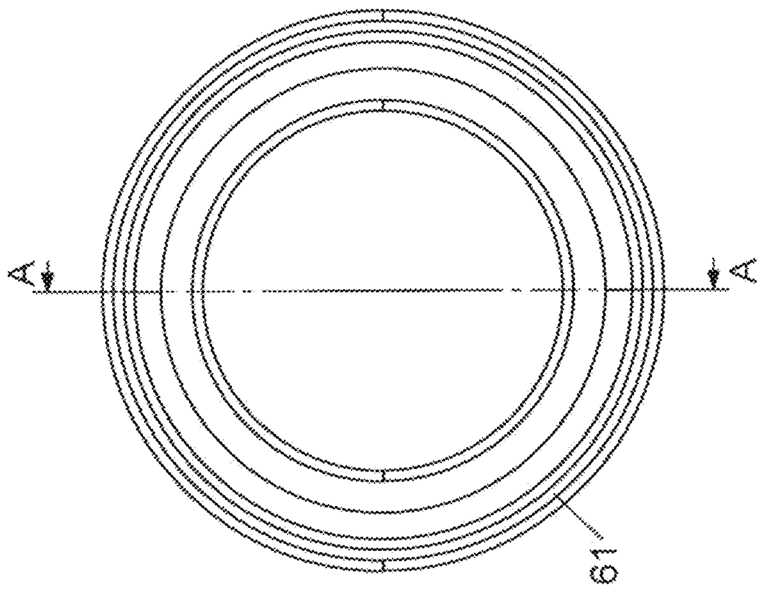
FIG. 7 is a front view of a control collar of the torque structure in accordance with the preferred embodiment of the present invention.
Figure 9:
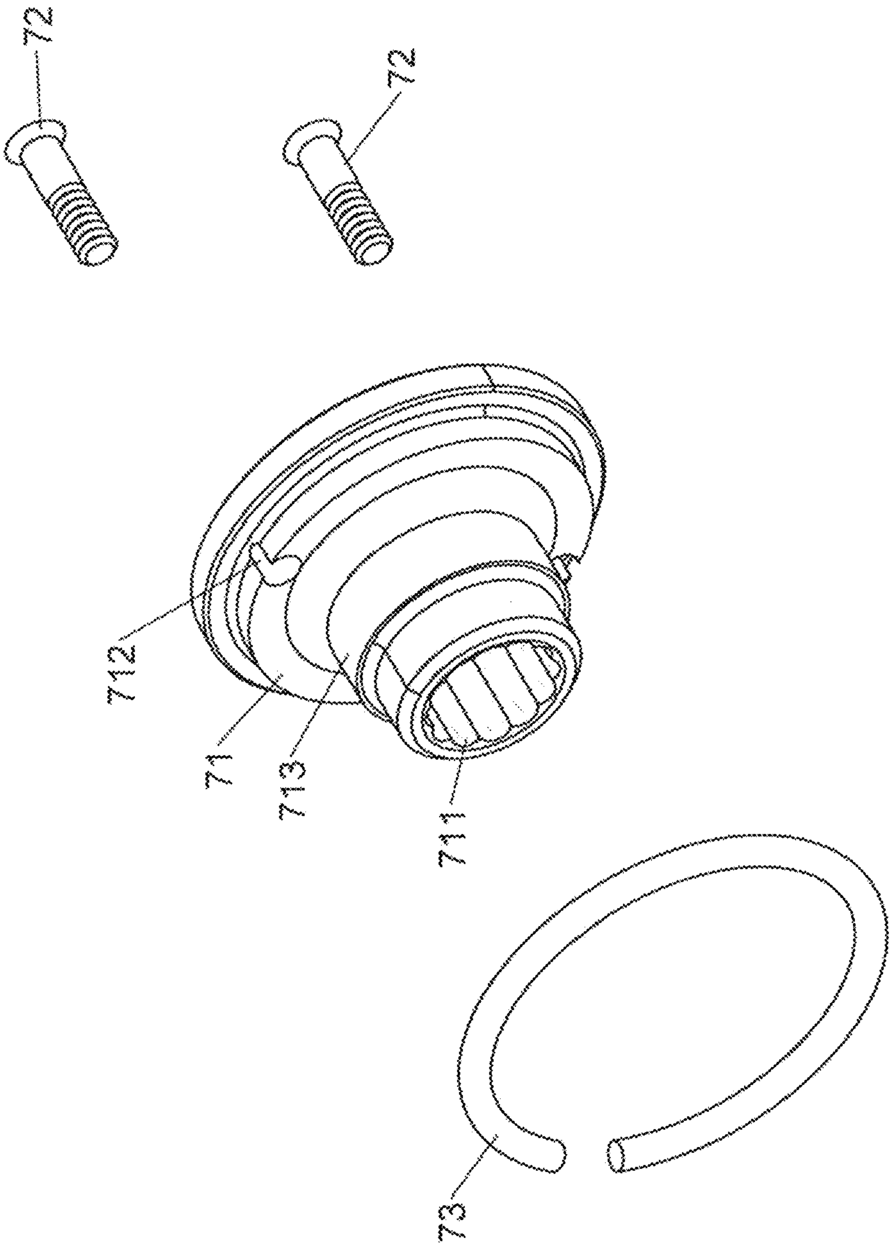
FIG. 9 is an exploded perspective view of a fourth body unit of the torque structure in accordance with the preferred embodiment of the present invention.
Figure 10:
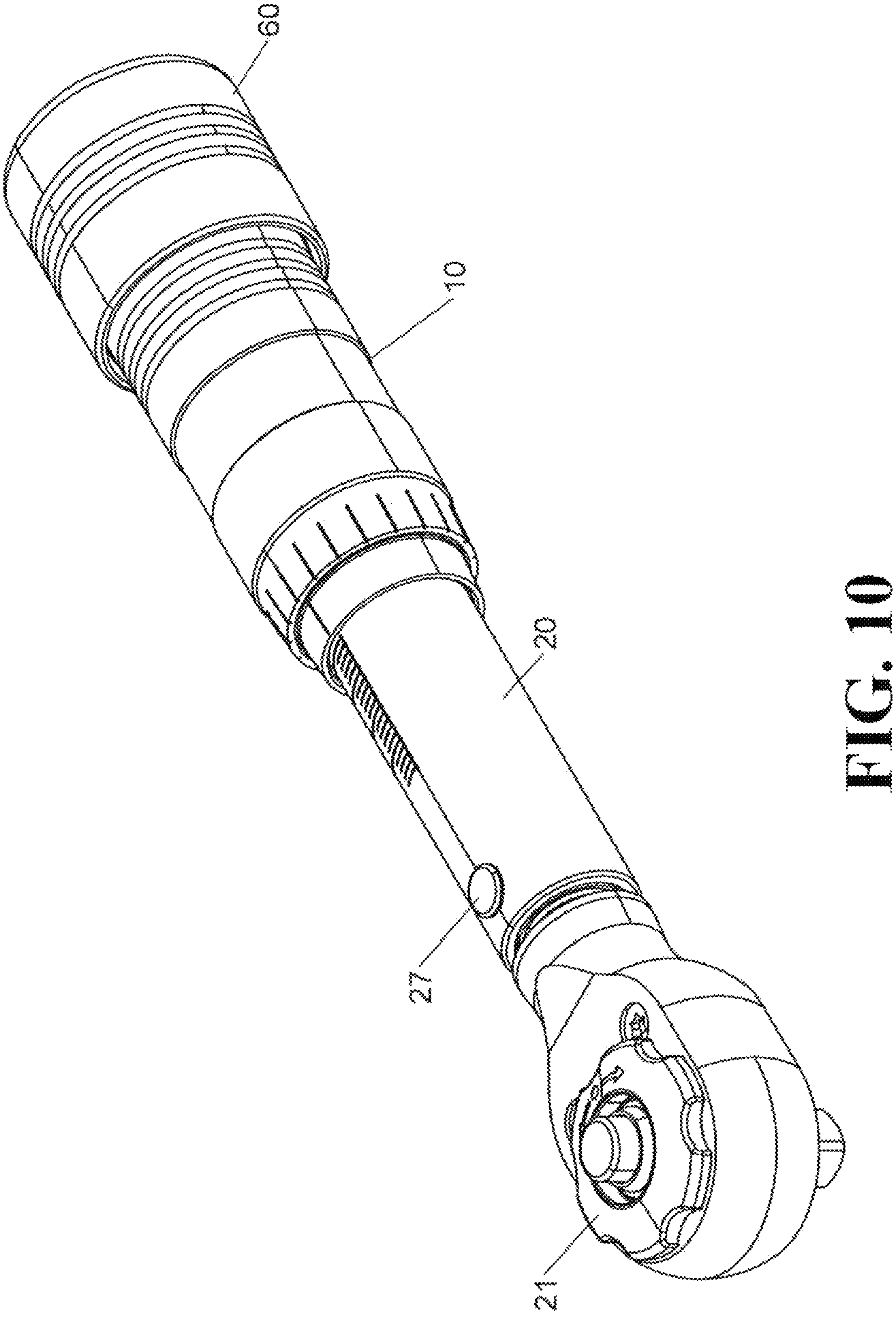
FIG. 10 is a perspective view of the torque structure in accordance with the preferred embodiment of the present invention.

Referring to the drawings and initially to FIGS. 1-10, a torque wrench in accordance with the preferred embodiment of the present invention comprises a first body 10, a second body 20, a first fixing (or securing or fastening) member 27, an elastic member 28, a push block 281, a locking unit 30, an adjusting unit 40, a third body unit 50, a control unit 60, a fourth body unit 70, a fitting member 80, and a cover 90.

The first body 10 is a circular rod and is held by a user. The first body 10 has a first end provided with a first receiving chamber 11 which is a hollow circular hole. The first body 10 is provided with a first indicator (or scale or display) 12. The first indicator 12 is arranged on an exterior of the first body 10 and includes multiple graduations (or scales) spaced and arranged annularly. The first body 10 is provided with a pivoting (or mounting or bushing) section 13 distant from the first indicator 12. The pivoting section 13 has a circular shape. The first body 10 is provided with two first slots (or openings or slits) 14 connected to the first receiving chamber 11. The two first slots 14 are arranged on the pivoting section 13 and are opposite to each other. Each of the two first slots 14 has an elongate shape. The first body 10 is provided with a first retaining (or limiting) groove 15 arranged on the pivoting section 13. The first retaining groove 15 has an annular shape and is connected to the two first slots 14.

The first body 10 is provided with a second retaining (or limiting) groove 16 having an annular shape. A determined distance is defined between the first retaining groove 15 and the second retaining groove 16. The first body 10 has a second end provided with a second receiving chamber 17 connected to the first receiving chamber 11. The second receiving chamber 17 has a diameter more than that of the first receiving chamber 11. The first body 10 is provided with a first pivot portion 18 arranged in the pivoting section 13. The first pivot portion 18 is ring shaped with a circular hole and is connected to the first receiving chamber 11. The first pivot portion 18 has a diameter less than that of the first receiving chamber 11. The second receiving chamber 17, the first receiving chamber 11, and the first pivot portion 18 penetrate the first body 10. The first body 10 is provided with two first fitting portions 19 arranged on an opening of the first pivot portion 18. The two first fitting portions 19 are arranged symmetrically. Each of the two first fitting portions 19 is a screw hole.

The second body 20 is pivotally connected with the first body 10. Thus, the first body 10 is rotatable relative to the second body 20 to adjust a torque value. The second body 20 is partially received in the first receiving chamber 11 and has a first end assembled with a drive portion 21 protruding from the first body 10. The second body 20 has a second end provided with a first guide slot 22 extending in a lengthwise direction of the second body 20. The first guide slot 22 has an elongate shape and is hidden in the first receiving chamber 11. The first guide slot 22 is distant from the drive portion 21. The second body 20 is provided with multiple first fixing (or securing or fastening) portions 23 close to the first guide slot 22. The first guide slot 22 is arranged between the drive portion 21 and the first fixing portions 23. The first fixing portions 23 are arranged annularly about an axis of the second body 20. Preferably, two first fixing portions 23 of the multiple first fixing portions 23 are arranged symmetrically.

The drive portion 21 is a ratchet wrench structure, a box-end wrench structure or an open-end wrench structure with a square head. The drive portion 21 is a hand tool device that is rotated independently in a normal direction and a reverse direction.

The second end of the second body 20 has an outer peripheral face provided with multiple positioning grooves 24 which are arranged annularly about the axis of the second body 20. The positioning grooves 24 align with the two first slots 14. Preferably, the multiple positioning grooves 24 of the second body 20 are ten, twelve or twenty positioning grooves 24. Each of the positioning grooves 24 has a concave shape. The second body 20 is provided with a second guide slot 25 hidden in the first receiving chamber 11. The second guide slot 25 is opposite to the first guide slot 22 and has an elongate shape.

The first fixing member 27 extends through the second body 20 and the drive portion 21 so that the second body 20 is assembled with the drive portion 21.

The elastic member 28 and the push block 281 are received in the second body 20 and elastically biased on an end of the drive portion 21. Thus, the drive portion 21 is driven by the elastic member 28 and the push block 281 and has a torque slip or laterally shiftable function when the torque value reaches a preset value.

The locking unit 30 is assembled with the second body 20. The locking unit 30 is not movable or rotatable relative to the second body 20. The locking unit 30 includes a locking seat 31, multiple second fixing (or securing or fastening) members 32, and multiple first balls 33.

The locking seat 31 is mounted in the second body 20 and is not movable or rotatable relative to the second body 20. The locking seat 31 is provided with a second pivot portion 311. The second pivot portion 311 is a circular hole penetrating the locking seat 31. The locking seat 31 is provided with multiple second fixing (or securing or fastening) portions 312 aligning with the first fixing portions 23 respectively. The second fixing portions 312 have a number equal to that of the first fixing portions 23. Each of the second fixing portions 312 is a through hole. The second fixing portions 312 are connected to the second pivot portion 311. The multiple second fixing portions 312 of the locking seat 31 comprise two second fixing portions 312. The locking seat 31 is provided with a first ball groove 314 close to an opening of the second pivot portion 311. The first ball groove 314 has an annular shape and is hidden in the second body 20.

The second fixing members 32 are mounted on the first fixing portions 23 and the second fixing portions 312 respectively, so that the locking seat 31 is assembled with the second body 20. The second fixing members 32 have a number equal to that of the second fixing portions 312. Each of the second fixing members 32 is a ball or a pin.

The first balls 33 are received in the first ball groove 314. Each of the first balls 33 is rolled freely in the first ball groove 314.

The adjusting unit 40 is assembled with the second body 20 and the locking unit 30. The adjusting unit 40 directly or indirectly pushes and presses the elastic member 28. When the first body 10 is rotated relative to the second body 20, the first body 10 drives the adjusting unit 40 to operate and adjust the torque value. The adjusting unit 40 includes an adjusting member 41, a first seat 42, and a third fixing (or securing or fastening) member 43.

Figure 13:
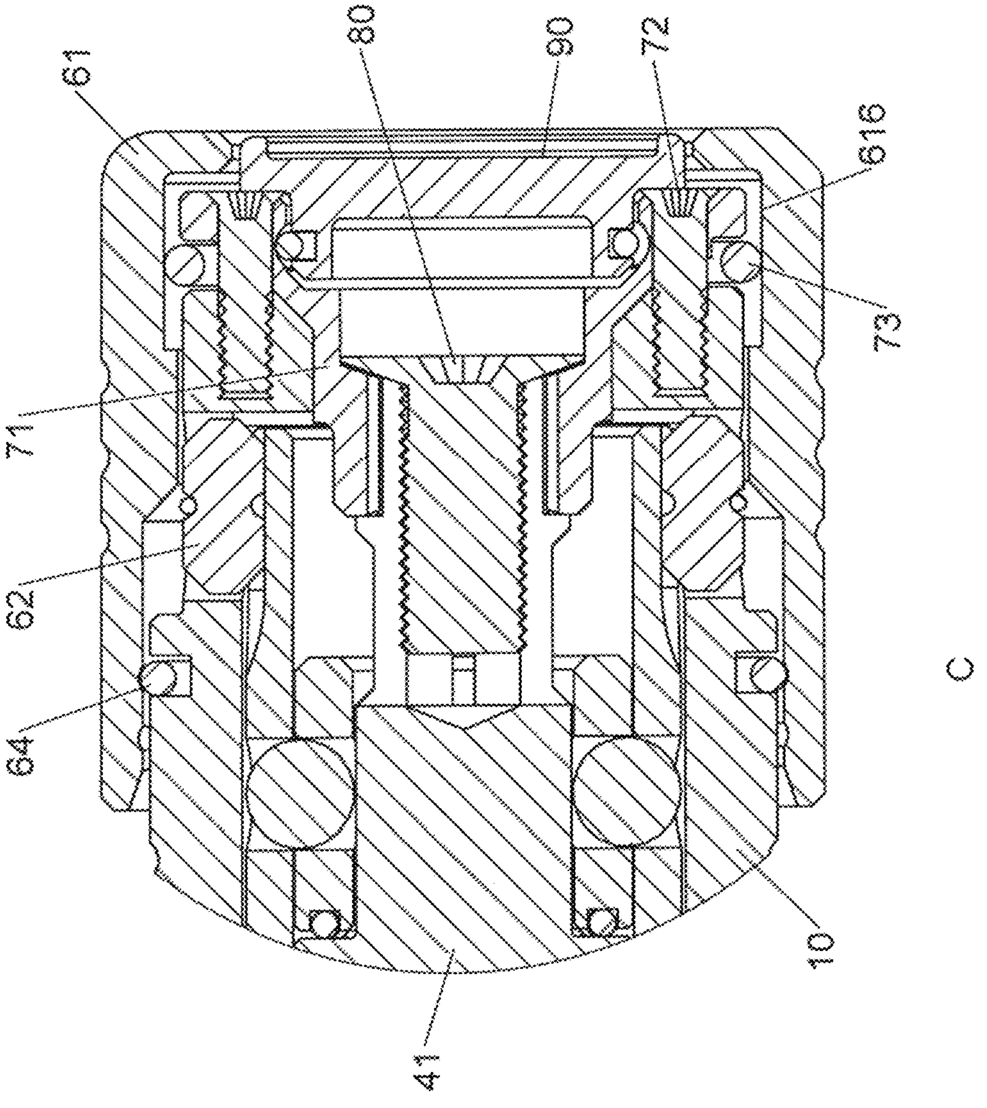
FIG. 13 is a locally enlarged view of the torque structure taken along circle C as shown in FIG. 12.

The adjusting member 41 is mounted in the second body 20 and the locking unit 30. The adjusting member 41 is rotated in place in the second body 20 and the locking unit 30. The adjusting member 41 is provided with a spacer 411 received in the second body 20. The spacer 411 has a circular shape. The spacer 411 has a first end provided with a first screw portion 412 received in the second body 20. The first screw portion 412 is an external thread and has a diameter less than that of the spacer 411. The spacer 411 has a second end provided with a third pivot portion 413 pivotally mounted in the locking unit 30. The third pivot portion 413 is rotated relative to the locking unit 30. The spacer 411 is located between the first screw portion 412 and the third pivot portion 413. The third pivot portion 413 is a circular rod and has a diameter less than that of the spacer 411. The third pivot portion 413 is provided with a first mounting section 414. The third pivot portion 413 is located between the spacer 411 and the first mounting section 414. The first mounting section 414 is a hexagonal rod, polygonal rod or noncircular rod. The adjusting member 41 is provided with a second fitting portion 415 formed in the first mounting section 414. The second fitting portion 415 is a screw hole. The first mounting section 414 is provided with multiple second slots (or openings or slits) 416 connected to the second fitting portion 415. The first mounting section 414 is expanded and contracted elastically by provision of the second slots 416. The second slots 416 are arranged annularly with the adjusting member 41 served as an axis. The second fitting portion 415 has an end provided with a first inclined face 417. The first inclined face 417 has a conic shape as shown in FIG. 13.

The first balls 33 rest on the spacer 411 to provide a rolling friction force when the third pivot portion 413 is rotated relative to the second pivot portion 311 or when the adjusting member 41 is rotated relative to the locking unit 30.

The first seat 42 is received in the second body 20. The first seat 42 has a first end provided with a first abutting face 421 pressing the elastic member 28 which is elastically biased between the second body 20 and the first abutting face 421. The first seat 42 has a second end provided with a second screw portion 422 screwed onto the first screw portion 412. When the first screw portion 412 is rotated relative to the second screw portion 422, the first seat 42 is moved linearly in the second body 20 to adjust a length (or compression degree or stroke) of the elastic member 28 and to regulate the torque value of the torque structure, so that the first seat 42 is moved to approach the spacer 411 or moved away from the spacer 411. The second screw portion 422 is a screw hole. The first seat 42 is provided with a first receiving hole 423 aligning with the first guide slot 22. The first receiving hole 423 has a circular shape and has an axis perpendicular to that of the first seat 42. The first seat 42 is provided with a second receiving hole 424 aligning with the second guide slot 25. The second receiving hole 424 has a circular shape and has an axis perpendicular to that of the first seat 42.

The third fixing member 43 is received in the second guide slot 25 and the second receiving hole 424. The third fixing member 43 is movable in the second guide slot 25.

The first seat 42 is limited by the third fixing member 43 and is moved linearly in the second body 20. The third fixing member 43 is a pin.

The third body unit 50 is assembled with the first body 10, the second body 20, and the adjusting unit 40. The third body unit 50 is received in the second receiving chamber 17. The third body unit 50 is driven by the adjusting unit 40 and moved in the second receiving chamber 17. The third body unit 50 includes a fixed block 51, a limit member 52, a third body 53, and a fourth fixing (or securing or fastening) member 54.

The fixed block 51 is movable in the first guide slot 22. The fixed block 51 is provided with a first recess 511 and a second recess 512. The first recess 511 is an elongate slot and aligns with the first receiving hole 423. The second recess 512 is connected to the first recess 511. The second recess 512 is an elongate slot and is larger than the first recess 511. The fixed block 51 has an end provided with a third fixing (or securing or fastening) portion 513. The third fixing portion 513 is a hole penetrating the fixed block 51.

The limit member 52 in turn extends through the second recess 512, the first recess 511, and the first receiving hole 423. Thus, the fixed block 51 and the first seat 42 are assembled by the limit member 52 so that the fixed block 51 is moved with the first seat 42. Preferably, the limit member 52 is a rivet or a screw member. The limit member 52 has a head received in the second recess 512.

The third body 53 is received in the second receiving chamber 17 and has an end partially protruding from the first body 10. The third body 53 has a cylindrical shape and is assembled with the fixed block 51. The third body 53 is provided with a third receiving chamber 531 mounted on the second body 20. The third body 53 is provided with a second indicator (or scale or display) 532 corresponding to the first indicator 12. The second indicator 532 extends in a lengthwise direction of the third body 53. The second indicator 532 aligns with the first guide slot 22. The third body 53 is provided with a fourth fixing (or securing or fastening) portion 533 aligning with the third fixing portion 513. The fourth fixing portion 533 is connected to the third receiving chamber 531. The fourth fixing portion 533 has an axis perpendicular to that of the third body 53.

The fourth fixing member 54 in turn extends through the fourth fixing portion 533 and the third fixing portion 513. Thus, the third body 53 and the fixed block 51 are assembled integrally by the fourth fixing member 54 so that the third body 53 is moved with the fixed block 51.

The control unit 60 is assembled with the first body 10. The control unit 60 is moved axially between a locked position where the first body 10 is non-rotatable relative to the second body 20 and an unlocked position where the first body 10 is rotatable relative to the second body 20. The control unit 60 includes a control collar (or sleeve) 61, two positioning members 62, a first ring 63, and a second ring 64.

The control collar 61 has a ring shape and is made of metal or plastic material. The control collar 61 is mounted on the first body 10 and is moved axially on the first body 10 between the locked position and the unlocked position. The control collar 61 is provided with a first peripheral face 611 having a minimum diameter. The control collar 61 is provided with a second peripheral face 612 having a diameter more than that of the first peripheral face 611. The control collar 61 is provided with a conic (or tapered) groove 613 disposed between the first peripheral face 611 and the second peripheral face 612. The conic groove 613 is expanded gradually from the first peripheral face 611 toward the second peripheral face 612. The control collar 61 is provided with a first positioning portion 614 and a second positioning portion 615 disposed beside the second peripheral face 612. Each of the first positioning portion 614 and the second positioning portion 615 is an annular groove. The first positioning portion 614 and the second positioning portion 615 are parallel with a determined distance defined therebetween. The second positioning portion 615 is close to an opening of the control collar 61. The control collar 61 is provided with a third peripheral face 616 having a diameter slightly more than that of the first peripheral face 611. The control collar 61 is provided with a cover hole 617 connected to the third peripheral face 616. The cover hole 617 has a diameter less than that of the third peripheral face 616. The control collar 61 is serially provided with the cover hole 617, the third peripheral face 616, the first peripheral face 611, the conic groove 613, the second peripheral face 612, the first positioning portion 614, and the second positioning portion 615 which are connected to each other.

Each of the two positioning members 62 has a cylindrical shape and is made of metal. The two positioning members 62 are received in the two first slots 14 and hidden in the control collar 61. The control collar 61 is moved axially on the pivoting section 13 and moved relative to the two positioning members 62, so that the two positioning members 62 are received in the first peripheral face 611, the conic groove 613 or the second peripheral face 612. Each of the two positioning members 62 is provided with an annular groove 621 and has two conic ends.

The first ring 63 is mounted in the first retaining groove 15 of the first body 10 and the annular groove 621 of each of the two positioning members 62, so that the first ring 63 is not detached from the first body 10, and the two positioning members 62 are secured to and not detached from the two first slots 14 of the first body 10. The first ring 63 has an elastic restoring force.

The second ring 64 is mounted in the second retaining groove 16 of the first body 10 and hidden in the control collar 61. When the control collar 61 is moved on the pivoting section 13, the second ring 64 is positioned in the first positioning portion 614 or the second positioning portion 615. Thus, the second ring 64 has a positioning effect and has an elastic feature to provide an elastic resistance to the control collar 61 during displacement.

In practice, when the second ring 64 is positioned in the first positioning portion 614, each of the two positioning members 62 is limited by the first ring 63 and the first peripheral face 611 and is locked in one of the positioning grooves 24, and the first body 10 and the second body 20 are limited by the two positioning members 62, so that the first body 10 is non-rotatable relative to the second body 20 and is disposed at the locked position. When the control collar 61 is moved on the first body 10 to the unlocked position, the second ring 64 is positioned in the second positioning portion 615, each of the two positioning members 62 is released from the first peripheral face 611 and is unlocked from one of the positioning grooves 24, and the first body 10 and the second body 20 are released from the two positioning members 62, so that the first body 10 is rotatable relative to the second body 20 and is disposed at the unlocked position.

The fourth body unit 70 is assembled with the first body 10 and the adjusting unit 40. The fourth body unit 70 includes a fourth body 71, two screw members 72, and a third ring 73.

The fourth body 71 is assembled with the first body 10 and has a first end provided with a second mounting section 711 mounted on the first mounting section 414. The second mounting section 711 is loosely fitted on the first mounting section 414. The second mounting section 711 is a dodecagonal recess, hexagonal recess, polygonal recess or non-circular recess. The fourth body 71 has a second end provided with two third fitting portions 712 aligning with the two first fitting portions 19. Each of the two third fitting portions 712 is a circular through hole. The fourth body 71 is provided with a fourth pivot portion 713 mounted on the first pivot portion 18. The fourth pivot portion 713 has a diameter more than that of the second mounting section 711 and less than that of each of the two third fitting portions 712.

The two screw members 72 extend through the two third fitting portions 712 and are screwed into the two first fitting portions 19 respectively, so that the fourth body 71 is assembled with the first body 10.

The third ring 73 is mounted between the fourth body 71 and the first body 10 and received in the third peripheral face 616. Thus, when the control collar 61 is moved, the third peripheral face 616 is moved relative to the third ring 73, so that third ring 73 restricts a maximum distance of displacement of the control collar 61.

The fitting member 80 is assembled with the fourth body unit 70 and the adjusting unit 40. The fitting member 80 is a threaded rod. The fitting member 80 extends through the second mounting section 711 and is screwed into the second fitting portion 415, so that the fourth body unit 70 is assembled with the adjusting unit 40. The fitting member 80 has an end provided with a second inclined face 81 abutting the first inclined face 417. The second slots 416 are slightly expanded outward by screwing of the fitting member 80, and the first mounting section 414 presses the second mounting section 711, so that the second mounting section 711 is closely fitted on the first mounting section 414. Thus, the fourth body unit 70 is assembled with the adjusting unit 40 closely without forming a gap therebetween.

It is appreciated that, the second mounting section 711 is secured to the first mounting section 414, so that the fourth body 71 is secured to the adjusting member 41, while the two screw members 72 extend through the two third fitting portions 712 and are screwed into the two first fitting portions 19 respectively, so that the fourth body 71 is secured to the first body 10. Thus, the adjusting member 41 is secured to the first body 10, so that when the first body 10 is rotated, the adjusting member 41 is rotated with the first body 10.

The cover 90 is received in the cover hole 617 to seal the cover hole 617.

Figure 11:
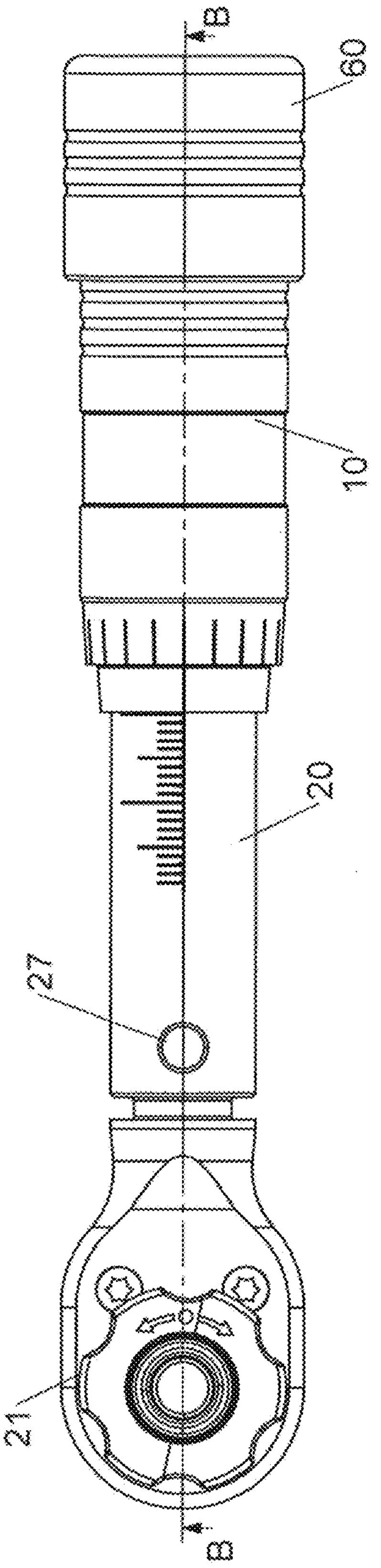
FIG. 11 is a top view of the torque structure in accordance with the preferred embodiment of the present invention.
Figure 12:
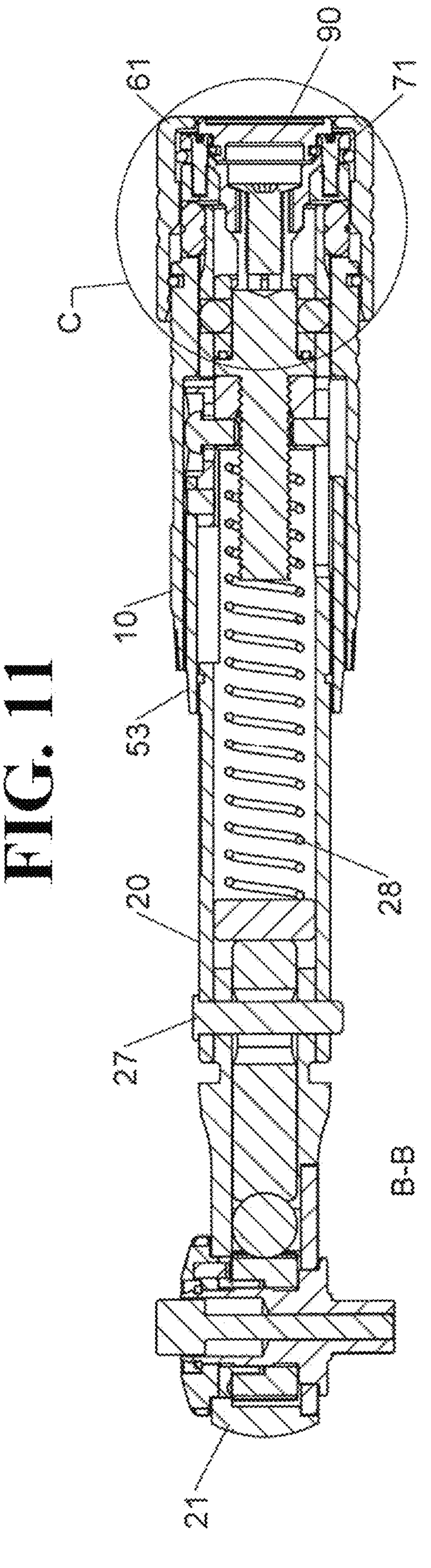
FIG. 12 is a cross-sectional view of the torque structure taken along line B-B as shown in FIG. 11.

Referring to FIGS. 11-13 with reference to FIGS. 1-10, when the first body 10 is rotated relative to the second body 20, the adjusting member 41 is rotated with the first body 10, and the first seat 42 is moved linearly in the second body 20 by rotation of the adjusting member 41, to adjust the compression degree of the elastic member 28 and to regulate the torque value of the torque structure. The fixed block 51 of the third body unit 50 is driven by the first seat 42 of the adjusting unit 40 and moved in the first guide slot 22, while the third body 53 is driven by the fixed block 51 and moved in the second receiving chamber 17. When the control collar 61 is moved on the first body 10 to the locked position, the second ring 64 is positioned in the first positioning portion 614, each of the two positioning members 62 is limited by the first ring 63 and the first peripheral face 611 and is locked in one of the positioning grooves 24, and the first body 10 and the second body 20 are limited by the two positioning members 62, so that the first body 10 is non-rotatable relative to the second body 20 and is disposed at the locked position. The fourth body unit 70 is assembled with the first body 10 and the adjusting unit 40. The fitting member 80 extends through the second mounting section 711 of the fourth body 71 and is screwed into the second fitting portion 415, so that the fourth body unit 70 is assembled with the adjusting unit 40. The cover 90 is inserted into in the cover hole 617 to seal the cover hole 617 and the fourth body 71.

Figure 15:
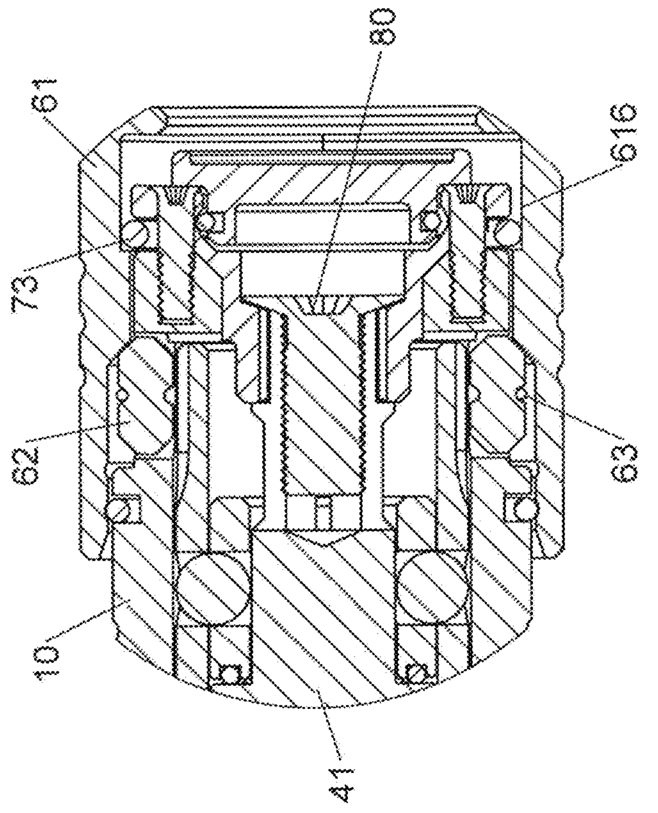
FIG. 15 is a locally enlarged view of the torque structure taken along circle C as shown in FIG. 14.
Figure 14:
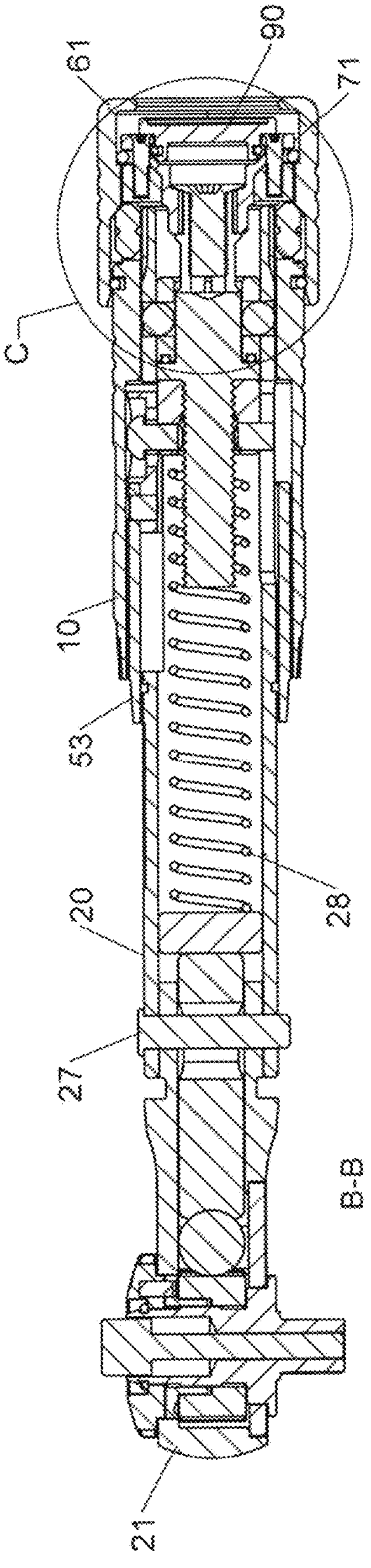
FIG. 14 is a schematic operational view of the as shown in FIG. 12.

Referring to FIGS. 14 and 15 with reference to FIGS. 1-13, when the control collar 61 is moved on the first body 10 to the unlocked position, the second ring 64 is positioned in the second positioning portion 615, each of the two positioning members 62 is released from the first peripheral face 611 and is unlocked from one of the positioning grooves 24, and the first body 10 and the second body 20 are released from the two positioning members 62, so that the first body 10 is rotatable relative to the second body 20 and is disposed at the unlocked position.

Figure 16:
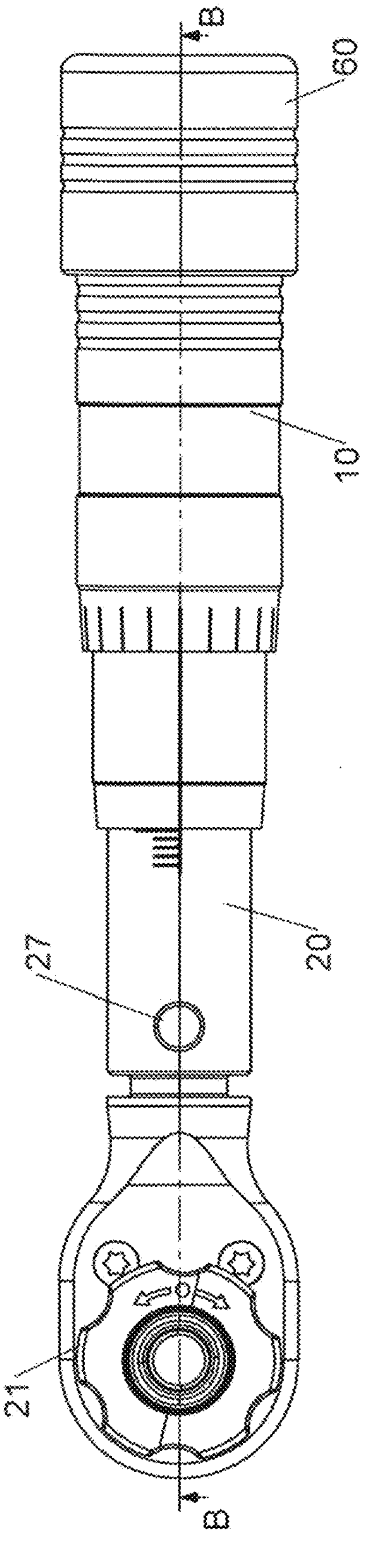
FIG. 16 is a schematic operational view of the as shown in FIG. 11.
Figure 17:
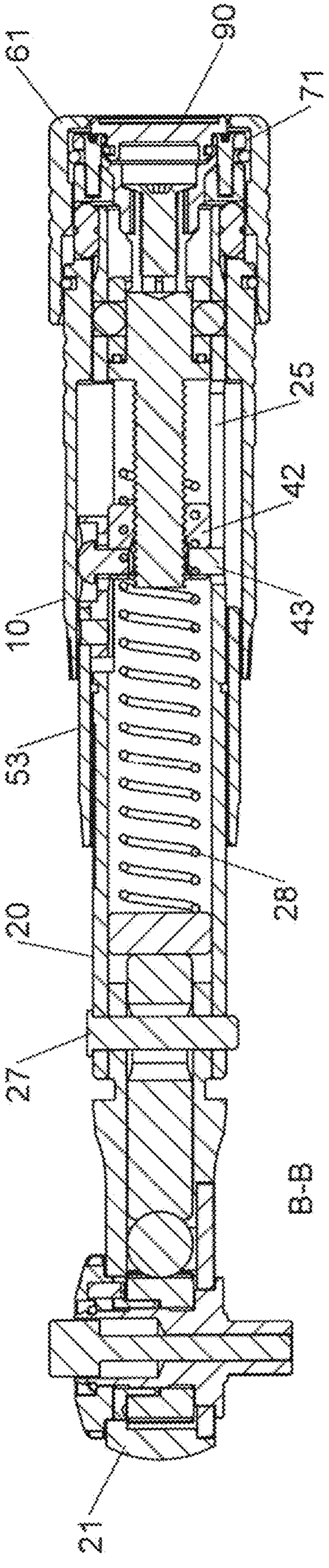
FIG. 17 is a cross-sectional view of the torque structure taken along line B-B as shown in FIG. 16.

Referring to FIGS. 16 and 17 with reference to FIGS. 1-15, when the first body 10 is rotated relative to the second body 20, the adjusting member 41 is rotated with the first body 10, and the first seat 42 is moved linearly in the second body 20 by rotation of the adjusting member 41, to compress the elastic member 28 and to regulate the torque value of the torque structure. Thus, when the torque value is adjusted to the maximum, the length of the elastic member 28 is compressed to the minimum.

Figure 18:
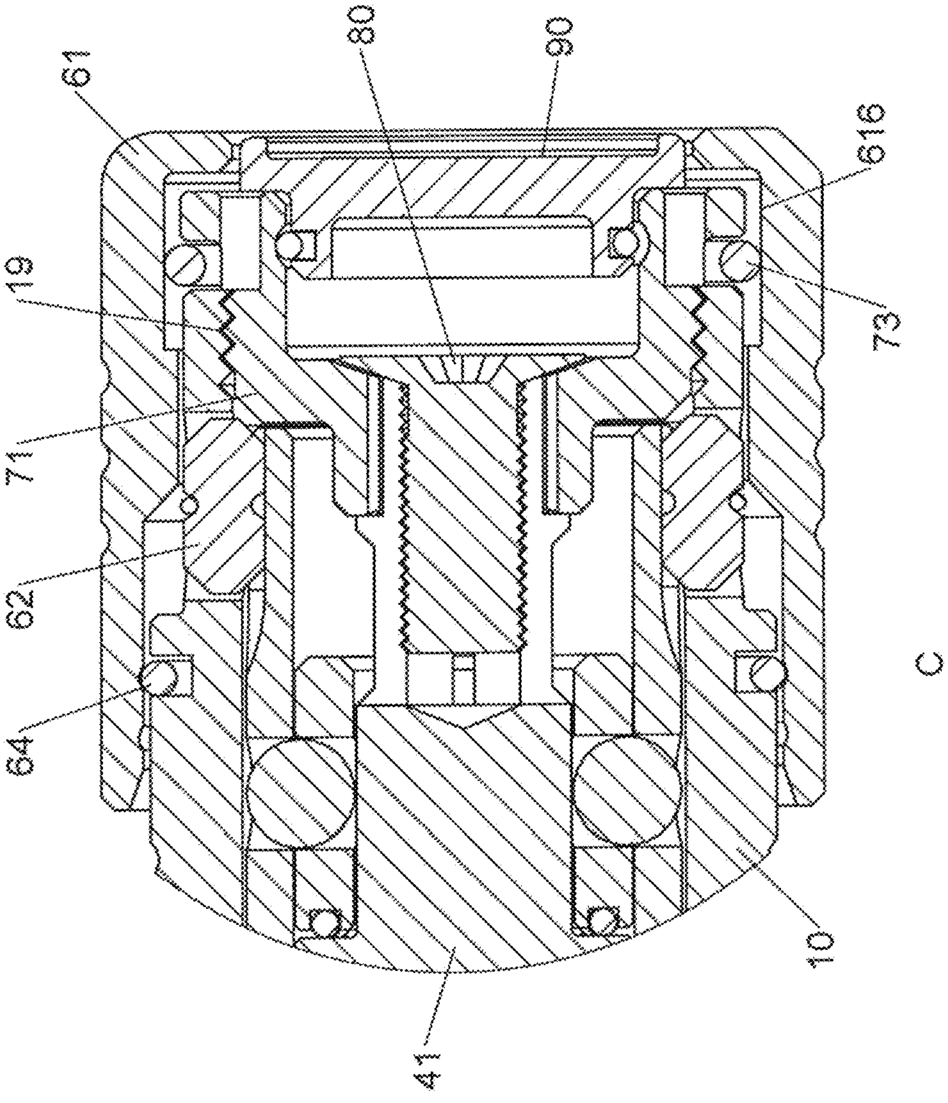
FIG. 18 is a partial cross-sectional view of a torque structure in accordance with a second preferred embodiment of the present invention.

Referring to FIG. 18 with reference to FIGS. 1-10, the two screw members 72 of the fourth body unit 70 are undefined. The first body 10 is provided with a first fitting portion 19 having an internal thread. The fourth body unit 70 is assembled with the first body 10. The fourth body 71 of the fourth body unit 70 has an external thread screwed onto the first fitting portion 19 of the first body 10.

Figure 19:
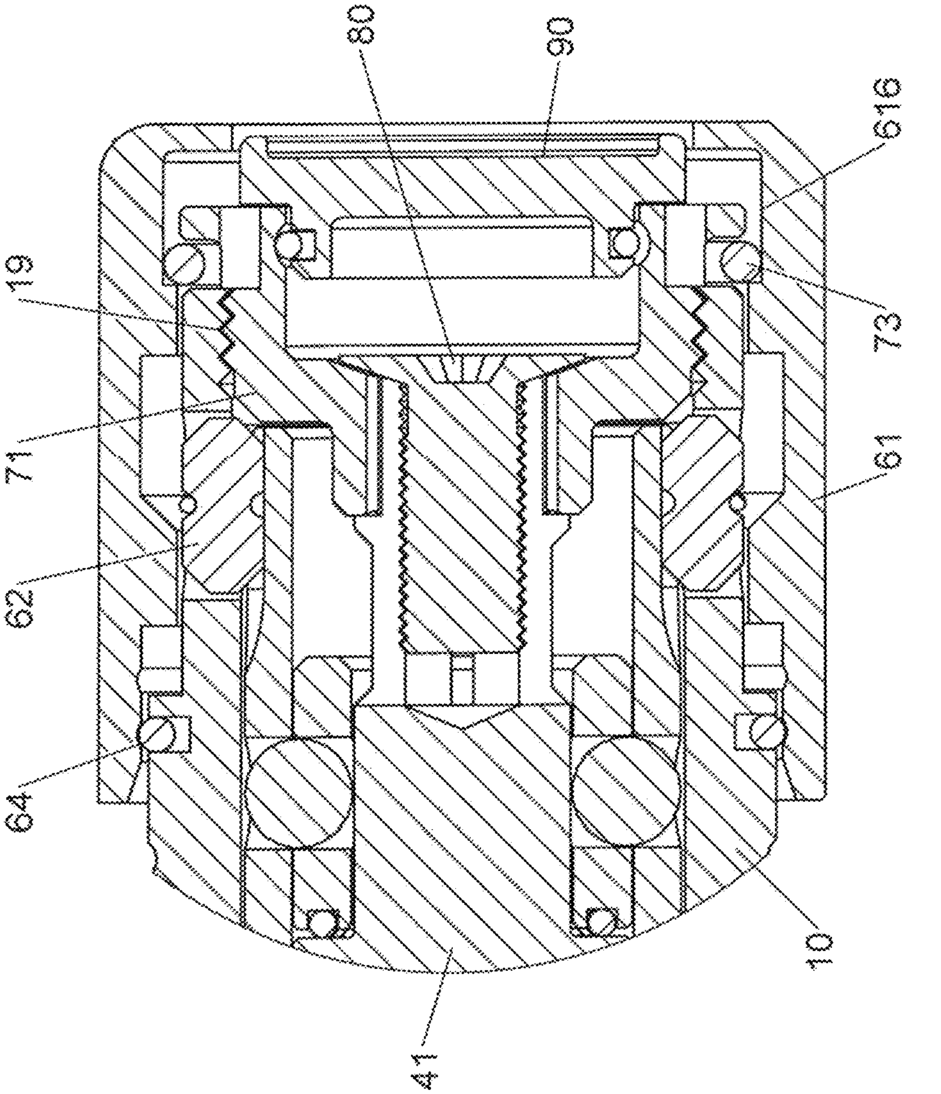
FIG. 19 is a partial cross-sectional view of a torque structure in accordance with a third preferred embodiment of the present invention.
Figure 20:
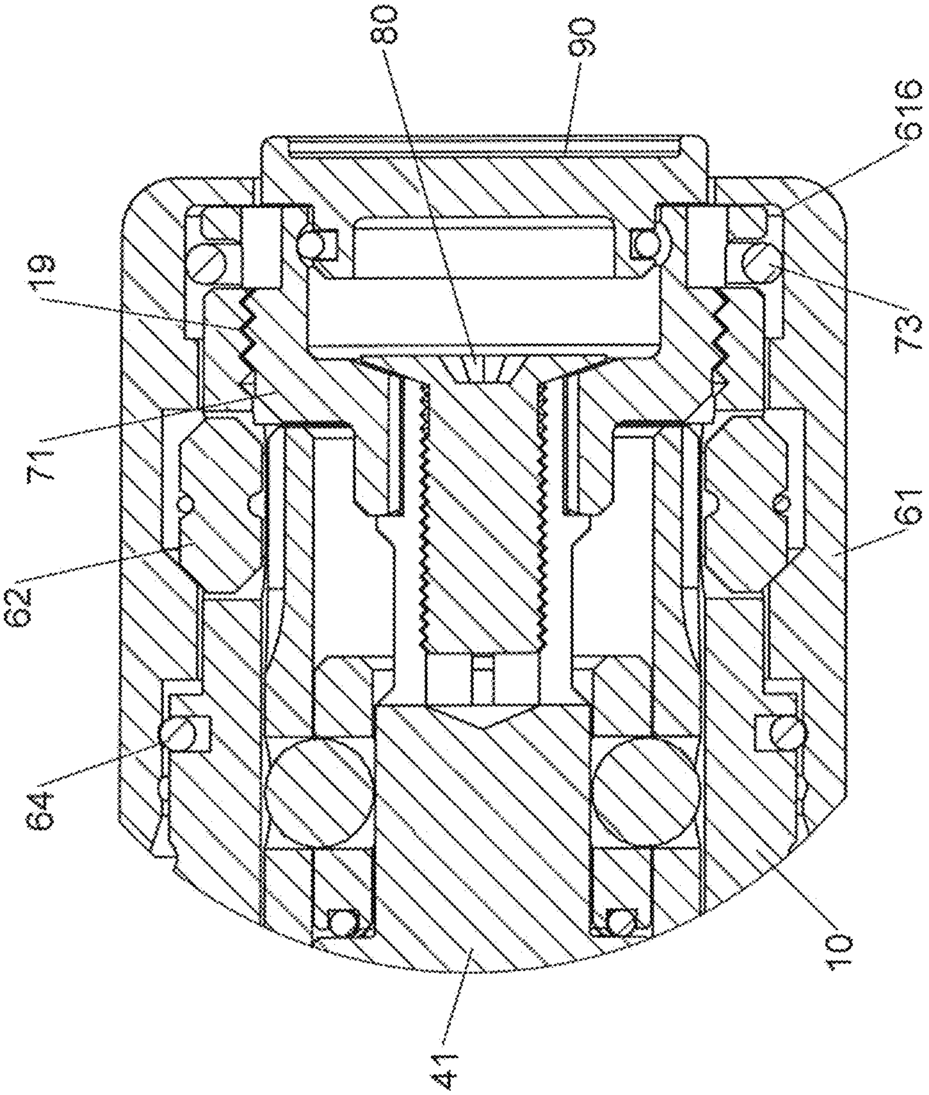
FIG. 20 is a schematic operational view of the as shown in FIG. 19.

Referring to FIGS. 19 and 20 with reference to FIGS. 1-15, the control unit 60 has a reversely unlocking structure. In practice, the first peripheral face 611, the second peripheral face 612, the conic groove 613, the first positioning portion 614, and the second positioning portion 615 are arranged reversely, so that the control collar 61 is moved toward the second body 20 to reach the unlocking position as shown in FIG. 20. As shown in FIG. 15, the control collar 61 is moved away from the second body 20 to reach the unlocking position.

In conclusion, the principle of the invention is in that, the third pivot portion 413 of the adjusting member 41 is provided with the first mounting section 414, the second fitting portion 415 is formed in the first mounting section 414, the first mounting section 414 is provided with the second slots 416, and the first mounting section 414 is expanded and contracted elastically by provision of the second slots 416. The fitting member 80 extends through the second mounting section 711 of the fourth body 71 and is screwed into the second fitting portion 415 of the adjusting member 41, so that the fourth body unit 70 is assembled with the adjusting unit 40. The second inclined face 81 of the fitting member 80 presses the first inclined face 417, the second slots 416 are slightly expanded outward by screwing of the fitting member 80, and the first mounting section 414 presses the second mounting section 711, so that the second mounting section 711 is closely fitted on the first mounting section 414. Thus, the fourth body unit 70 is assembled with the adjusting unit 40 closely without forming a gap therebetween.

Accordingly, the torque structure of the present invention has the following advantages.

1. When the fitting member 80 extends through the second mounting section 711 of the fourth body 71 and is screwed into the second fitting portion 415 of the adjusting member 41 after the fourth body unit 70 is assembled with the adjusting unit 40, the second inclined face 81 of the fitting member 80 presses the first inclined face 417, the second slots 416 are slightly expanded outward by screwing of the fitting member 80, and the first mounting section 414 presses the second mounting section 711, so that the second mounting section 711 is closely fitted on the first mounting section 414. Thus, the fourth body unit 70 is assembled with and disassembled from the adjusting unit 40 easily and conveniently by operation of the fitting member 80.

2. The second mounting section 711 is initially fitted on the first mounting section 414 loosely. When the fitting member 80 is screwed into the second fitting portion 415 of the adjusting member 41, the second inclined face 81 of the fitting member 80 presses the first inclined face 417 of the adjusting member 41, to expand the first mounting section 414 slightly, and the first mounting section 414 presses the second mounting section 711, so that the second mounting section 711 is fitted on the first mounting section 414 exactly, and the fourth body 71 is closely fitted on the adjusting member 41. Thus, the fourth body unit 70 is mounted on the adjusting unit 40 closely without forming a gap therebetween.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A torque wrench comprising:

a first body, a second body, a first fixing member, an elastic member, a push block, a locking unit, an adjusting unit, a third body unit, a control unit, a fourth body unit, and a fitting member;

wherein:

the first body has a first end provided with a first receiving chamber which is a hollow circular hole;

the first body is provided with a first indicator;

the first indicator is arranged on an exterior of the first body and includes multiple graduations spaced and arranged annularly;

the first body is provided with a pivoting section distant from the first indicator;

the pivoting section has a circular shape;

the first body is provided with two first slots connected to the first receiving chamber;

the two first slots are arranged on the pivoting section and are opposite to each other;

each of the two first slots has an elongate shape;

the first body is provided with a first retaining groove arranged on the pivoting section;

the first retaining groove has an annular shape and is connected to the two first slots;

the first body is provided with a second retaining groove having an annular shape;

a determined distance is defined between the first retaining groove and the second retaining groove;

the first body has a second end provided with a second receiving chamber connected to the first receiving chamber;

the second receiving chamber has a diameter more than that of the first receiving chamber;

the first body is provided with a first pivot portion arranged in the pivoting section;

the first pivot portion is ring shaped with a circular hole and is connected to the first receiving chamber;
the first pivot portion has a diameter less than that of the first receiving chamber;
the second receiving chamber, the first receiving chamber, and the first pivot portion penetrate the first body;
the first body is provided with two first fitting portions arranged on an opening of the first pivot portion;
the two first fitting portions are arranged symmetrically;
each of the two first fitting portions is a screw hole;
the second body is pivotally connected with the first body;
the first body is rotatable relative to the second body to adjust a torque value;
the second body is partially received in the first receiving chamber and has a first end assembled with a drive portion protruding from the first body;
the second body has a second end provided with a first guide slot extending in a lengthwise direction of the second body;
the first guide slot has an elongate shape and is hidden in the first receiving chamber;
the first guide slot is distant from the drive portion;
the second body is provided with multiple first fixing portions close to the first guide slot;
the first guide slot is arranged between the drive portion and the first fixing portions;
the first fixing portions are arranged annularly about an axis of the second body;
two first fixing portions of the multiple first fixing portions are arranged symmetrically;
the second end of the second body has an outer peripheral face provided with multiple positioning grooves which are arranged annularly about the axis of the second body;
the second body is provided with a second guide slot hidden in the first receiving chamber;
the second guide slot is opposite to the first guide slot and has an elongate shape;
the first fixing member extends through the second body and the drive portion so that the second body is assembled with the drive portion;
the elastic member and the push block are received in the second body and elastically biased on an end of the drive portion;
the drive portion is driven by the elastic member and the push block and has a torque slip function when the torque value reaches a preset value;
the locking unit is assembled with the second body;
the locking unit is not movable or rotatable relative to the second body;
the adjusting unit is assembled with the second body and the locking unit;
the adjusting unit directly or indirectly pushes and presses the elastic member;
when the first body is rotated relative to the second body, the first body drives the adjusting unit to operate and adjust the torque value;
the adjusting unit includes an adjusting member, a first seat, and a third fixing member;
the adjusting member is mounted in the second body and the locking unit;
the adjusting member is rotated in place in the second body and the locking unit;
the adjusting member is provided with a spacer received in the second body;
the spacer has a first end provided with a first screw portion received in the second body;
the spacer has a second end provided with a third pivot portion pivotally mounted in the locking unit;
the third pivot portion is rotated relative to the locking unit;
the spacer is located between the first screw portion and the third pivot portion;
the third pivot portion is provided with a first mounting section;
the third pivot portion is located between the spacer and the first mounting section;
the adjusting member is provided with a second fitting portion formed in the first mounting section;
the second fitting portion is a screw hole;
the first mounting section is provided with multiple second slots connected to the second fitting portion;
the first mounting section is expanded and contracted elastically by provision of the second slots;
the second fitting portion has an end provided with a first inclined face;
the first seat is received in the second body;
the first seat has a first end provided with a first abutting face pressing the elastic member which is elastically biased between the second body and the first abutting face;
the first seat has a second end provided with a second screw portion screwed onto the first screw portion;
when the first screw portion is rotated relative to the second screw portion, the first seat is moved linearly in the second body to adjust a length of the elastic member, so that the first seat is moved to approach the spacer or moved away from the spacer;
the second screw portion is a screw hole;
the first seat is provided with a first receiving hole aligning with the first guide slot;
the first receiving hole has a circular shape and has an axis perpendicular to that of the first seat;
the first seat is provided with a second receiving hole aligning with the second guide slot;
the second receiving hole has a circular shape and has an axis perpendicular to that of the first seat;
the third fixing member is received in the second guide slot and the second receiving hole;
the third fixing member is movable in the second guide slot;
the first seat is limited by the third fixing member and is moved linearly in the second body;
the third fixing member is a pin;
the third body unit is assembled with the first body, the second body, and the adjusting unit;
the third body unit is received in the second receiving chamber;
the third body unit is driven by the adjusting unit and moved in the second receiving chamber;
the third body unit includes a fixed block, a limit member, a third body, and a fourth fixing member;
the fixed block is movable in the first guide slot and is provided with a first recess and a second recess;
the first recess is an elongate slot and aligns with the first receiving hole;
the second recess is connected to the first recess;
the second recess is an elongate slot and is larger than the first recess;
the fixed block has an end provided with a third fixing portion;
the third fixing portion is a hole penetrating the fixed block;

the limit member in turn extends through the second recess, the first recess, and the first receiving hole;

the fixed block and the first seat are assembled by the limit member;

the limit member is a rivet or a screw member;

the limit member has a head received in the second recess;

the third body is received in the second receiving chamber and has an end partially protruding from the first body;

the third body has a cylindrical shape and is assembled with the fixed block;

the third body is provided with a third receiving chamber mounted on the second body;

the third body is provided with a second indicator corresponding to the first indicator;

the second indicator extends in a lengthwise direction of the third body;

the second indicator aligns with the first guide slot;

the third body is provided with a fourth fixing portion aligning with the third fixing portion;

the fourth fixing portion is connected to the third receiving chamber;

the fourth fixing portion has an axis perpendicular to that of the third body;

the fourth fixing member in turn extends through the fourth fixing portion and the third fixing portion;

the third body and the fixed block are assembled integrally by the fourth fixing member so that the third body is moved with the fixed block;

the control unit is assembled with the first body;

the control unit is moved axially between a locked position where the first body is non-rotatable relative to the second body and an unlocked position where the first body is rotatable relative to the second body;

the fourth body unit is assembled with the first body and the adjusting unit;

the fourth body unit includes a fourth body assembled with the first body and having a first end provided with a second mounting section mounted on the first mounting section;

the second mounting section is loosely fitted on the first mounting section;

the fitting member is assembled with the fourth body unit and the adjusting unit;

the fitting member is a threaded rod;

the fitting member extends through the second mounting section and is screwed into the second fitting portion, so that the fourth body unit is assembled with the adjusting unit;

the fitting member has an end provided with a second inclined face abutting the first inclined face;

the second slots are slightly expanded outward by screwing of the fitting member, and the first mounting section presses the second mounting section, so that the second mounting section is closely fitted on the first mounting section; and the fourth body unit is assembled with the adjusting unit closely without forming a gap therebetween.

2. The torque wrench as claimed in claim 1, wherein the first body is a circular rod and is held by a user.

3. The torque wrench as claimed in claim 1, wherein:

the drive portion is a ratchet wrench structure, a box-end wrench structure or an open-end wrench structure with a square head; and the drive portion is a hand tool device that is rotated independently in a normal direction and a reverse direction.

4. The torque wrench as claimed in claim 1, wherein the multiple positioning grooves of the second body are ten, twelve or twenty positioning grooves, and each of the positioning grooves has a concave shape.

5. The torque wrench as claimed in claim 1, wherein:

the locking unit includes a locking seat, multiple second fixing members, and multiple first balls;

the locking seat is mounted in the second body and is not movable or rotatable relative to the second body;

the locking seat is provided with a second pivot portion;

the second pivot portion is a circular hole penetrating the locking seat;

the locking seat is provided with multiple second fixing portions aligning with the first fixing portions respectively;

the second fixing portions have a number equal to that of the first fixing portions;

each of the second fixing portions is a through hole;

the second fixing portions are connected to the second pivot portion;

the multiple second fixing portions of the locking seat comprise two second fixing portions;

the locking seat is provided with a first ball groove close to an opening of the second pivot portion;

the first ball groove has an annular shape and is hidden in the second body;

the second fixing members are mounted on the first fixing portions and the second fixing portions respectively, so that the locking seat is assembled with the second body;

the second fixing members have a number equal to that of the second fixing portions;

each of the second fixing members is a ball or a pin;

the first balls are received in the first ball groove;

each of the first balls is rolled freely in the first ball groove; and the first balls rest on the spacer to provide a rolling friction force when the third pivot portion is rotated relative to the second pivot portion or when the adjusting member is rotated relative to the locking unit.

6. The torque wrench as claimed in claim 1, wherein:

the spacer has a circular shape;

the first screw portion is an external thread and has a diameter less than that of the spacer;

the third pivot portion is a circular rod and has a diameter less than that of the spacer;

the first mounting section is a hexagonal rod, polygonal rod or noncircular rod;

the second slots are arranged annularly with the adjusting member served as an axis; and the first inclined face has a conic shape.

7. The torque wrench as claimed in claim 1, wherein:

the control unit includes a control collar, two positioning members, a first ring, and a second ring;

the control collar has a ring shape and is made of metal or plastic material;

the control collar is mounted on the first body and is moved axially on the first body between the locked position and the unlocked position;

the control collar is provided with a first peripheral face having a minimum diameter;

the control collar is provided with a second peripheral face having a diameter more than that of the first peripheral face;

the control collar is provided with a conic groove disposed between the first peripheral face and the second peripheral face;

the conic groove is expanded gradually from the first peripheral face toward the second peripheral face;

the control collar is provided with a first positioning portion and a second positioning portion disposed beside the second peripheral face;

each of the first positioning portion and the second positioning portion is an annular groove;

the first positioning portion and the second positioning portion are parallel;

the second positioning portion is close to an opening of the control collar;

the control collar is provided with a third peripheral face having a diameter slightly more than that of the first peripheral face;

the control collar is provided with a cover hole connected to the third peripheral face;

the cover hole has a diameter less than that of the third peripheral face;

the control collar is serially provided with the cover hole, the third peripheral face, the first peripheral face, the conic groove, the second peripheral face, the first positioning portion, and the second positioning portion which are connected to each other;

each of the two positioning members has a cylindrical shape and is made of metal;

the two positioning members are received in the two first slots and hidden in the control collar;

the control collar is moved axially on the pivoting section, so that the two positioning members are received in the first peripheral face, the conic groove or the second peripheral face;

each of the two positioning members is provided with an annular groove and has two conic ends;

the first ring is mounted in the first retaining groove of the first body and the annular groove of each of the two positioning members, so that the first ring is not detached from the first body, and the two positioning members are secured to and not detached from the two first slots of the first body;

the first ring has an elastic restoring force;

the second ring is mounted in the second retaining groove and hidden in the control collar;

when the control collar is moved on the pivoting section, the second ring is positioned in the first positioning portion or the second positioning portion;

the second ring has a positioning effect and has an elastic feature to provide an elastic resistance to the control collar during displacement;

when the second ring is positioned in the first positioning portion, each of the two positioning members is limited by the first ring and the first peripheral face and is locked in one of the positioning grooves, and the first body and the second body are limited by the two positioning members, so that the first body is non-rotatable relative to the second body and is disposed at the locked position; and when the control collar is moved on the first body to the unlocked position, the second ring is positioned in the second positioning portion, each of the two positioning members is released from the first peripheral face and is unlocked from one of the positioning grooves, and the first body and the second body are released from the two positioning members, so that the first body is rotatable relative to the second body and is disposed at the unlocked position.

8. The torque wrench as claimed in claim 7, wherein:

the second mounting section is a dodecagonal recess, polygonal recess or noncircular recess;

the fourth body has a second end provided with two third fitting portions aligning with the two first fitting portions;

each of the two third fitting portions is a circular through hole;

the fourth body is provided with a fourth pivot portion mounted on the first pivot portion;

the fourth pivot portion has a diameter more than that of the second mounting section and less than that of each of the two third fitting portions;

the fourth body unit further includes two screw members, and a third ring;

the two screw members extend through the two third fitting portions and are screwed into the two first fitting portions respectively, so that the fourth body is assembled with the first body;

the third ring is mounted between the fourth body and the first body and received in the third peripheral face; and when the control collar is moved, the third peripheral face is moved relative to the third ring, so that third ring restricts a maximum distance of displacement of the control collar.

9. The torque wrench as claimed in claim 7, further comprising:

a cover received in the cover hole to seal the cover hole.

10. The torque wrench as claimed in claim 1, wherein:

the first body is provided with a first fitting portion having an internal thread;

the fourth body unit is assembled with the first body; and the fourth body of the fourth body unit has an external thread screwed onto the first fitting portion of the first body.

11. The torque wrench as claimed in claim 7, wherein the control unit has a reversely unlocking structure, and the first peripheral face, the second peripheral face, the conic groove, the first positioning portion, and the second positioning portion are arranged reversely, so that the control collar is moved toward the second body to reach the unlocking position.

* * * * *